(12) United States Patent
Hage et al.

(10) Patent No.: US 8,331,416 B2
(45) Date of Patent: Dec. 11, 2012

(54) STRIPLINE LASER

(75) Inventors: Hermann Hage, Hamburg (DE); Volker Scholz, Luebeck (DE); Florian Engel, Hamurg (DE)

(73) Assignee: Rofin Sinar Laser GmbH, Hamburg (DE)

( * ) Notice: Subject to any disclaimer, the term of this patent is extended or adjusted under 35 U.S.C. 154(b) by 0 days.

(21) Appl. No.: 13/480,983

(22) Filed: May 25, 2012

(65) Prior Publication Data
US 2012/0236897 A1 Sep. 20, 2012

Related U.S. Application Data

(63) Continuation of application No. PCT/EP2011/058812, filed on May 30, 2011.

(30) Foreign Application Priority Data

Jun. 8, 2010 (DE) .......... 10 2010 029 821
Sep. 6, 2010 (DE) .......... 10 2010 040 298

(51) Int. Cl.
*H01S 3/097* (2006.01)

(52) U.S. Cl. ............ 372/87; 372/81; 372/61; 372/65; 372/55

(58) Field of Classification Search .......... 372/87, 372/81, 61, 65, 55
See application file for complete search history.

(56) References Cited

U.S. PATENT DOCUMENTS

| | | | |
|---|---|---|---|
| 3,569,859 A | 3/1971 | Whitney | |
| 4,719,639 A | 1/1988 | Tulip | |
| 4,875,218 A * | 10/1989 | Hongo et al. | 372/64 |
| 4,939,738 A | 7/1990 | Opower | |
| 5,088,102 A * | 2/1992 | Krueger et al. | 372/64 |
| 5,412,681 A | 5/1995 | Eisel et al. | |
| 2010/0118898 A1 | 5/2010 | Markillie et al. | |

FOREIGN PATENT DOCUMENTS

| | | |
|---|---|---|
| EP | 0 305 893 A2 | 3/1989 |
| EP | 0 444 442 A2 | 9/1991 |
| JP | 3022577 A | 1/1991 |

OTHER PUBLICATIONS

Teuma, T., et al., "Mode selectivity using selective layered and combined metallic-dielectric electrodes in slab waveguide resonators", XIII International Symposium on Gas Flow and Chemical Lasers and High-Power Laser Conference, 2001, pp. 286-290, Proceedings of SPIE vol. 4184.

* cited by examiner

*Primary Examiner* — Kinam Park
(74) *Attorney, Agent, or Firm* — Laurence A. Greenberg; Werner H. Stemer; Ralph E. Locher

(57) ABSTRACT

In a stripline laser, a gas mixture containing carbon dioxide is situated as a laser-active medium between two plate-type electrodes lying with their flat sides opposite one another. The electrodes define a discharge space, at whose end sides lying opposite one another a resonator mirror is respectively arranged. The resonator mirrors form an unstable resonator. To operate the stripline laser in the 9.3 μm band and/or in the 9.6 μm band, the electrodes are provided with a passivation layer on their flat sides. The passivation layer, of at least one electrode, contains silicon dioxide in a region covering a partial area of a flat side. A distance between the electrodes is set such that the attenuation of laser beams in the 10.3 μm band and in the 10.6 μm band is greater than the attenuation of laser beams in the 9.3 μm band and/or in the 9.6 μm band.

7 Claims, 2 Drawing Sheets

STRIPLINE LASER

CROSS-REFERENCE TO RELATED APPLICATION

This is a continuation application, under 35 U.S.C. §120, of copending international application No. PCT/EP2011/058812, filed May 30, 2011, which designated the United States; this application also claims the priority, under 35 U.S.C. §119, of German patent application No. DE 10 2010 029 821.2, filed Jun. 8, 2010; and DE 10 2010 040 298.2, filed Sep. 6, 2010; the prior applications are herewith incorporated by reference in their entirety.

BACKGROUND OF THE INVENTION

Field of the Invention

The invention relates to a stripline laser as is known, for example, from published, European patent application EP 0 305 893 A2, corresponding to U.S. Pat. No. 4,939,738, or U.S. Pat. No. 4,719,639.

Such a stripline or slab laser is a laser whose resonator is a combination of a waveguide resonator and an unstable resonator of the positive or negative branch. In the case of such a stripline laser, a gas mixture containing carbon dioxide $CO_2$ is situated in a narrow discharge space formed between two flat plate-type electrodes. The gas mixture situated between the electrodes is excited by the application of a high-frequency electromagnetic field. A resonator mirror is respectively arranged opposite the end faces of the narrow parallelepipedal discharge space formed in this way. In a plane oriented parallel to the flat sides of the electrodes, the resonator mirrors form an unstable confocal resonator with free beam propagation. Perpendicular thereto, the propagation conditions of the electromagnetic radiation arising within the discharge space are defined by the waveguide properties of the electrodes.

The electrodes consist of metal or a dielectric material. In U.S. Pat. No. 4,719,639 an electrically conductive metal, for example aluminum, or a dielectric, for example aluminum oxide $Al_2O_3$, is mentioned as suitable material for the electrodes, wherein, in the latter case, an electrically conductive metal has to be arranged on the side facing away from the discharge space.

It is also known from published, European patent application EP 0 444 442 A2, corresponding to U.S. Pat. No. 5,08, 102, to passivate an electrode consisting of aluminum, on its surface facing the discharge space, by a layer consisting of aluminum oxide $Al_2O_3$.

In such a laser, the beam distribution in the direction of the unstable axis, i.e. parallel to the electrodes and to the end face of the discharge space, is substantially defined by the geometry of the resonator mirrors. In the waveguide axis perpendicular to the unstable axis, the surfaces of the electrodes as delimiting wall of the waveguide have a crucial influence on the formation of the beam distribution in this direction. The properties of the surface, i.e. the roughness thereof and the material of which they consist, and the mutual distance between them determine which resonator mode finds the most favorable propagation conditions. Thus, it is known from U.S. patent publication No. 2010/0118898 A1, for example, by use of cutouts introduced into the electrodes, to bring about mode selection in such a way that the laser oscillates stably in a fundamental mode. The parameters mentioned furthermore influence not only the geometrical beam properties but also the wavelength emitted by the laser. In this case, it has been found that a stripline laser whose electrodes is provided with a layer of aluminum oxide $Al_2O_3$ on the flat side facing the discharge space operates almost exclusively in the 10.6 μm band.

For specific applications it is desired, however, to use laser radiation in the 9.3 μm band or 9.6 μm band. For this purpose, it is known from U.S. Pat. No. 5,412,681 to use wavelength-selective resonator mirrors. This leads to unsatisfactory results in the high-power range, however, since the requisite coating of the resonator mirrors is less suitable for very high laser powers. As an alternative thereto, it is also known to set a desired wavelength selectivity by choosing the isotope composition of the gas mixture. However, such a procedure is technically and economically expedient only in the case of so-called sealed-off lasers, in which the laser gas does not have to be replaced.

SUMMARY OF THE INVENTION

It is accordingly an object of the invention to provide a stripline laser which overcomes the above-mentioned disadvantages of the prior art devices of this general type, which makes it possible to generate laser radiation in the 9.3 μm band and/or in the 9.6 μm band.

The stated object is achieved according to the invention by a stripline laser. The stripline laser contains as an laser-active medium a gas mixture containing carbon dioxide $CO_2$, which is situated between two plate-type electrodes situated with their flat sides opposite one another. The electrodes define a discharge space, at whose end sides situated opposite one another a resonator mirror is respectively arranged, which form an unstable resonator parallel to the flat sides, wherein the electrodes are provided with a passivation layer on their flat sides situated opposite one another. The passivation layer, in the case of at least one electrode, contains silicon dioxide $SiO_2$ in a region covering at least one partial area of the flat side. A distance between the electrodes is set in such a way that the attenuation of laser beams in the 10.3 μm and in the 10.6 μm band is greater than the attenuation of laser beams in the 9.3 μm band and/or in the 9.6 μm band.

In this case, the invention is based on the insight that as a result of the at least partial coating of the electrodes with a material containing silicon dioxide $SiO_2$, preferably having a layer thickness of approximately 0.5 to 5 μm, the attenuation experienced by a laser beam propagating within the waveguide in the 10.3 μm band and in the 10.6 μm band can be set by the choice of the mutual distance between the electrodes in such a way that it is greater than in the 9.3 μm band and/or in the 9.6 μm band. On account of these higher losses in the 10.3 μm band and in the 10.6 μm band, the oscillation build-up thereof is prevented in the resonator, such that a stripline laser constructed in this way operates stably in the 9.3 μm band and/or in the 9.6 μm band, wherein one of these two bands can be selected by optimized design. In this case, the effect is all the more pronounced, the higher the proportion of silicon dioxide $SiO_2$ in the passivation layer.

Particularly effective suppression can be obtained if the proportion by volume of silicon dioxide $SiO_2$ in the total volume of the passivation layer applied to both electrodes is at least 25%, or, as an alternative thereto, the partial area or the sum of all the partial areas is at least 25% of the total area of both flat sides and the passivation layer consists of silicon dioxide $SiO_2$ in the region of the partial area or of the partial areas.

Oscillation build-up is best suppressed if, in one particular advantageous configuration of the invention, the passivation layer of both opposite flat sides consists of silicon dioxide $SiO_2$.

Other features which are considered as characteristic for the invention are set forth in the appended claims.

Although the invention is illustrated and described herein as embodied in a stripline laser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
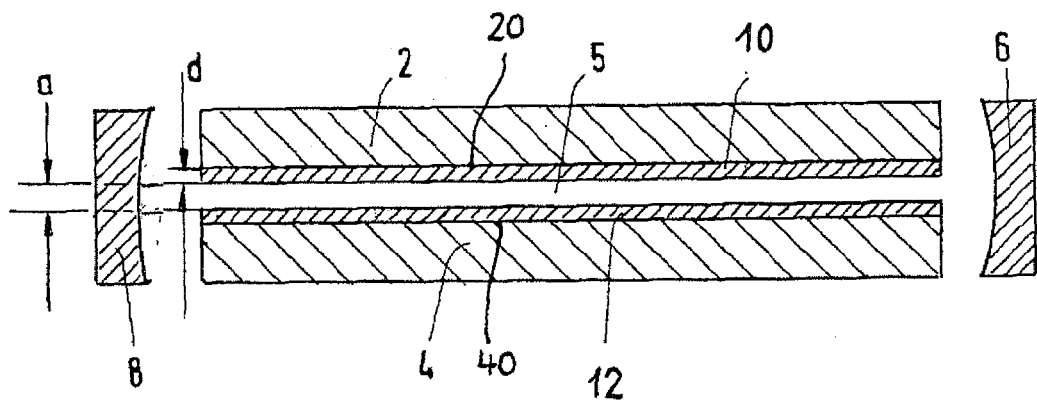
FIGS. 1 to 3 are diagrammatic, longitudinal sectional views in each case of alternative exemplary embodiments of a stripline laser according to the invention.

Referring now to the figures of the drawing in detail and first, particularly, to FIG. 1 thereof, there is shown a stripline laser that has plate-type electrodes 2 and 4 arranged opposite one another at a distance a, a gas mixture containing carbon dioxide $CO_2$ being situated as laser gas between the electrodes 2, 4. The electrodes 2 and 4 define a narrow, parallelepipedal discharge space 5, in which the laser gas is excited by an RF voltage applied to the electrodes 2 and 4. Resonator mirrors 6 and 8 are arranged at the end sides of the discharge space 5 situated opposite one another, which resonator mirrors form an unstable confocal resonator in a plane running perpendicular to the plane of the drawing, the resonator being a negative-branch resonator in the example illustrated. As an alternative thereto, a positive-branch resonator can also be provided.

In the exemplary embodiment, the electrodes 2 and 4 consist of copper Cu or an alloy containing copper Cu, which are provided with a passivation layer 10 and 12 respectively on their flat sides 20, 40 facing one another, the layer thickness d of the passivation layer being between 0.5 μm and 5 μm, i.e. being very much smaller than the distance a and being depicted in exaggerated fashion in the figure. The passivation layers 10, 12 contain silicon dioxide $SiO_2$, wherein, in one preferred embodiment, the proportion by volume of silicon dioxide $SiO_2$ in the total volume of the passivation layers 10, 12 applied to both electrodes 2, 4 is at least 25%. The remaining constituents of the passivation layers 10, 12 can consist of aluminum oxide $Al_2O_3$ for example. In one particularly preferred embodiment, both passivation layers 10, 12 consist of silicon dioxide $SiO_2$.

Figure 2:
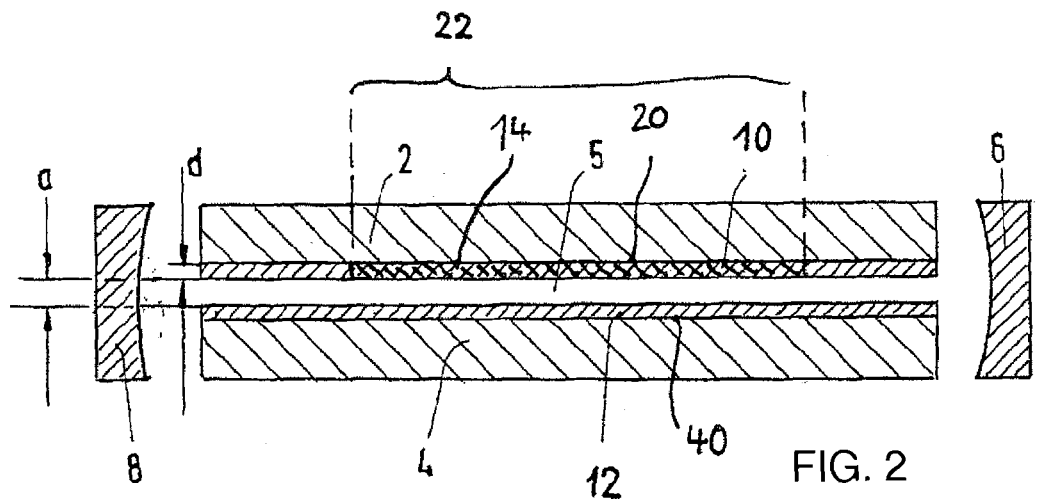

An alternative configuration is illustrated in the exemplary embodiment in FIG. 2, in which configuration only one of the electrodes, the electrode 2 in the example, is provided with a passivation layer 10, which contains silicon dioxide $SiO_2$ only in a region 14 highlighted by cross-hatching and covering or occupying a partial area 22 of the flat side 20 of the electrode 2, which is smaller than the area of a flat side 20 of the electrode 2.

Figure 3:
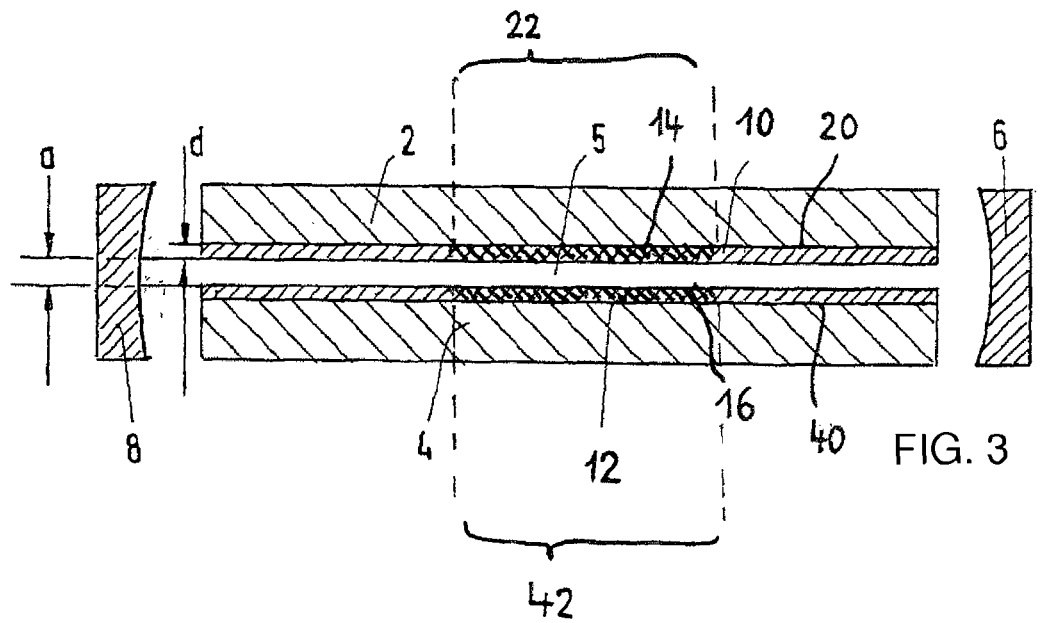

In accordance with FIG. 3, in a further alternative configuration, both passivation layers 10, 12 contain silicon dioxide $SiO_2$ in a region 14 and 16 covering a partial area 22 and 42, respectively, wherein the partial areas 22, 42 need not necessarily be situated opposite one another. Likewise, the partial areas 22, 42 or regions 14, 16 illustrated in FIGS. 2 and 3 need not necessarily form a continuous area.

In the embodiments in accordance with FIGS. 2 and 3, the partial area 22 or the partial areas 22, 42 and the proportion of silicon dioxide $SiO_2$ respectively present in the region of the partial area 14, 16 in the latter in the passivation layers 10, 12 are preferably dimensioned such that the proportion by volume of silicon dioxide $SiO_2$ in the total volume of the passivation layers 10 and 12 respectively applied to both electrodes 2, 4 is at least 25%. In other words, if the partial area 22 or the sum of all the partial areas 22, 42 is only 25% of the total area of both flat sides 20, 40 of both electrodes 2, 4, the passivation layer 10, 12 preferably completely consists of silicon dioxide $SiO_2$ in the region of the partial area 22 or partial areas 22, 42.

Figure 4:
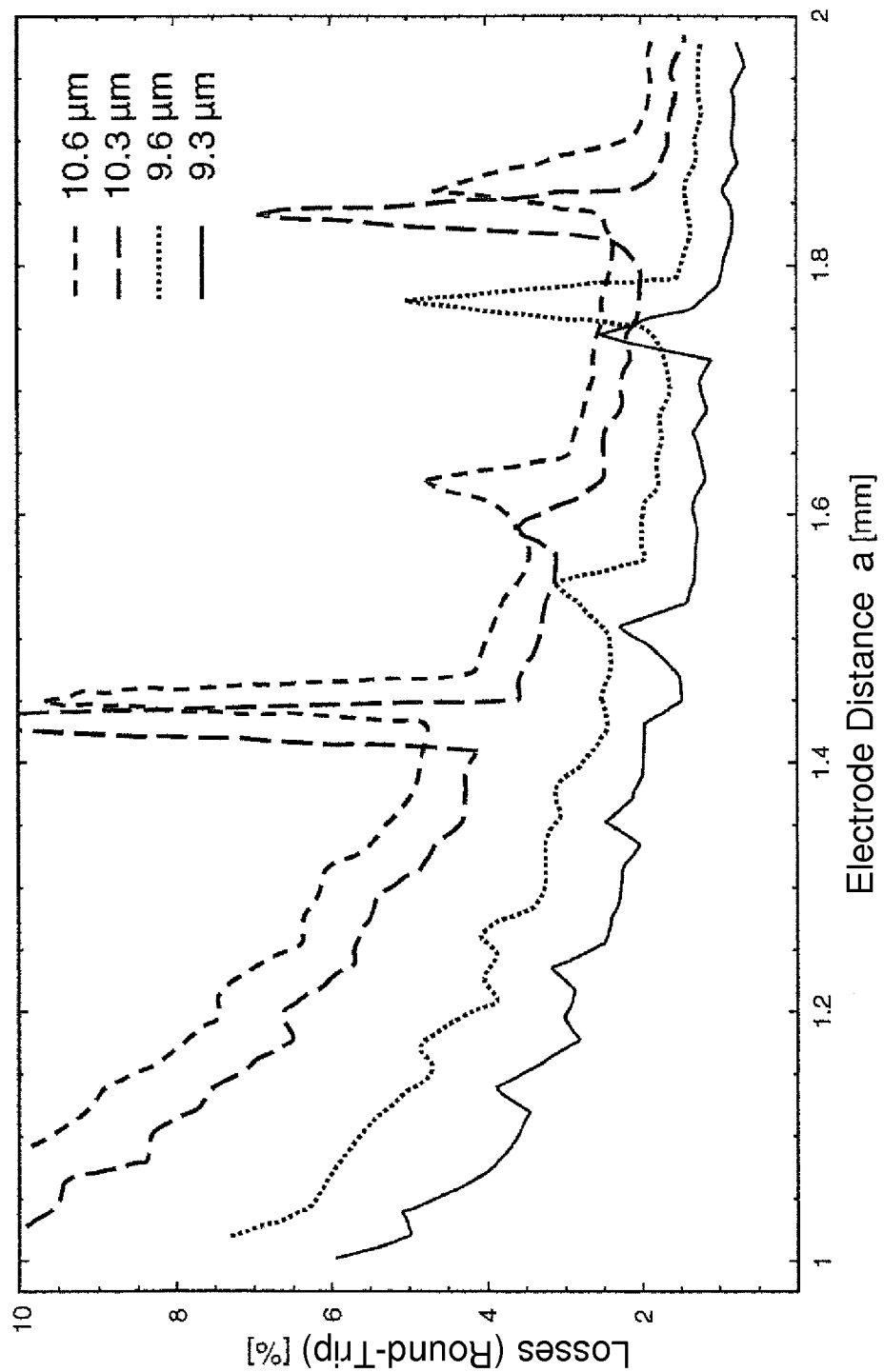
FIG. 4 is a diagram in which, for different wavelengths, a calculated loss during a circulation in a resonator of a one-dimensional waveguide constructed from $SiO_2$ is plotted against distance between electrodes.

In the diagram in FIG. 4, the calculated loss V per circulation in a one-dimensional waveguide having a length of 1.33 m is plotted as a function of the distance a between the electrodes for the wavelengths 9.3 μm, 9.6 μm, 10.3 μm and 10.6 μm, if the passivation layer applied to the electrodes consists of silicon dioxide $SiO_2$. The difference in the losses between the individual bands can be adapted to the respective requirement by suitable choice of the distance a. For an electrode distance a=1.7 mm, at 9.3 μm, 9.6 μm, 10.3 μm and 10.6 μm approximately the following percentage losses result in this case: 1.6%, 1.8%, 2.1% and 2.3%, respectively. These have the consequence that the resonator builds up oscillation only in the 9.3 μm band. It can be gathered from the diagram, moreover, that, in the case of an electrode distance a=1.75 mm, the 9.6 μm band has the lowest losses or the lowest attenuation and is accordingly selected. In the case of this electrode distance, moreover, the attenuation of the 9.3 μm band is higher than the attenuation of the 10.3 μm band and approximately equal to the attenuation of the 10.6 μm band. In other words: in order to prevent oscillation build-up of the 10.3 μm and of the 10.6 μm band, the attenuation of at least either the 9.3 μm band or of the 9.6 μm band must be lower than the attenuation of the 10.3 μm band and of the 10.6 μm band.

In addition to the coating—proposed according to the invention—of the electrodes with silicon dioxide $SiO_2$, in the case of stripline lasers configured for lower laser powers, the resonator mirrors can also be provided with a wavelength-selective coating in order additionally to suppress the oscillation build-up in the non-desired bands. It is likewise supplementarily possible to use, as a laser-active medium, an isotope mixture with which undesired bands can likewise be suppressed or desired bands can be selected. Particularly in these cases, the proportion of silicon dioxide $SiO_2$ in the passivation layer applied to the electrodes can be correspondingly reduced.

The invention claimed is:

1. A stripline laser, comprising:
   two plate-type electrodes having flat sides disposed opposite one another and defining a discharge space therebetween;
   a gas mixture containing carbon dioxide as a laser-active medium disposed between said plate-type electrodes;
   resonator mirrors, one of said resonator mirrors disposed at each of end sides situated opposite one another of said two plate-type electrodes, said resonator mirrors forming an unstable resonator parallel to said flat sides;

a passivation layer disposed on each of said flat sides situated opposite one another, said passivation layer, in a case of at least one of said two-plate-type electrodes, containing silicon dioxide in a region covering at least one partial area of said flat side; and said two plate-type electrodes disposed a distance apart such that an attenuation of laser beams in a 10.3 μm and in a 10.6 μm band is greater than an attenuation of laser beams in a 9.3 μm band and/or in a 9.6 μm band.

2. The stripline laser according to claim 1, wherein a proportion by volume of said silicon dioxide in a total volume of said passivation layer applied to both said electrodes is at least 25%.

3. The stripline laser according to claim 2, wherein said partial area is at least 25% of a total area of both said flat sides, said passivation layer consists of said silicon dioxide in a region of said partial area.

4. The stripline laser according to claim 1, wherein a layer thickness of said passivation layer is between 0.5 and 5 μm in a region of said partial area.

5. The stripline laser according to claim 1, wherein said passivation layer of both of said flat sides consists of said silicon dioxide.

6. The stripline laser according to claim 2, wherein both of said two-plate-type electrodes, contain said silicon dioxide in a region covering at least one partial area of each of said flat sides, a sum of both said partial areas is at least 25% of a total area of both said flat sides, said passivation layer consists of said silicon dioxide in said region of both of said partial areas.

7. The stripline laser according to claim 6, wherein a layer thickness of said passivation layer is between 0.5 and 5 μm in said region of both of said partial areas.

* * * * *